United States Patent

Cheng et al.

[11] Patent Number: 6,151,336
[45] Date of Patent: Nov. 21, 2000

[54] TIME DIVISION MULTIPLEXING EXPANSION SUBSYSTEM

[75] Inventors: Xin Cheng, San Diego; Shouhua Huang, Huntington Beach, both of Calif.

[73] Assignee: Sorrento Networks, Inc., San Diego, Calif.

[21] Appl. No.: 09/021,619

[22] Filed: Feb. 11, 1998

[51] Int. Cl.[7] .................................................. H04J 3/04
[52] U.S. Cl. ............................................................ 370/535
[58] Field of Search ................................. 370/535, 537, 370/538, 540, 542, 543, 544; 359/123

[56] References Cited

U.S. PATENT DOCUMENTS

| | | |
|---|---|---|
| 3,933,454 | 1/1976 | DeLuca . |
| 3,940,278 | 2/1976 | Wolf . |
| 3,950,075 | 4/1976 | Cook et al. . |
| 3,960,531 | 6/1976 | Kohanzadeh et al. . |
| 3,982,151 | 9/1976 | Ludovici et al. . |
| 3,999,836 | 12/1976 | Wolf . |
| 4,017,013 | 4/1977 | Hawk et al. . |
| 4,037,922 | 7/1977 | Claypoole . |
| 4,049,414 | 9/1977 | Smith . |

(List continued on next page.)

FOREIGN PATENT DOCUMENTS

| | | |
|---|---|---|
| 0 691 760 A2 | 1/1996 | European Pat. Off. . |
| 0 758 170 A2 | 2/1997 | European Pat. Off. . |
| 195 31 761 C1 | 5/1997 | Germany . |
| 04115735 | 4/1992 | Japan . |
| PCT/US99/02602 | 8/1999 | WIPO . |

OTHER PUBLICATIONS

Brochure, "GigaMux Series DWDM Fiber Optic Transmission Systems "Beaming New Life Into Fiber","Osicom Technologies, Inc., (late 1997).

(List continued on next page.)

*Primary Examiner*—Chau Nguyen
*Assistant Examiner*—Suibel M. H. Schuppner
*Attorney, Agent, or Firm*—Fulbright & Jaworski L.L.P.

[57] ABSTRACT

The present invention provides an expansion subsystem for dense wavelength division multiplexing systems allowing for the time division multiplexed transmission of lower speed information-bearing signals without regard to data rate or transmission format. The subsystem includes a transmitting station having data buffers, encoders for encoding a unique identification code from a channel identification generator, data scramblers, a multiplexing clock and a time division multiplexing unit, and a receiving station generally the mirror image of the transmitting station.

15 Claims, 7 Drawing Sheets

U.S. PATENT DOCUMENTS

| | | |
|---|---|---|
| 4,072,400 | 2/1978 | Claypoole et al. . |
| 4,081,500 | 3/1978 | Malcolm . |
| 4,083,625 | 4/1978 | Hudson . |
| 4,088,386 | 5/1978 | Hawk . |
| 4,100,008 | 7/1978 | Claypoole . |
| 4,102,561 | 7/1978 | Hawk et al. . |
| 4,105,284 | 8/1978 | Olshansky . |
| 4,125,388 | 11/1978 | Powers . |
| 4,135,779 | 1/1979 | Hudson . |
| 4,211,610 | 7/1980 | McGowan . |
| 4,280,827 | 7/1981 | Murphy et al. . |
| 4,328,018 | 5/1982 | Siegfried . |
| 4,351,658 | 9/1982 | Olshansky . |
| 4,360,371 | 11/1982 | Blankenship et al. . |
| 4,385,802 | 5/1983 | Blaszyk et al. . |
| 4,395,270 | 7/1983 | Blankenship et al. . |
| 4,413,882 | 11/1983 | Bailey et al. . |
| 4,415,230 | 11/1983 | Keck . |
| 4,436,368 | 3/1984 | Keck . |
| 4,437,870 | 3/1984 | Miller . |
| 4,453,961 | 6/1984 | Berkey . |
| 4,478,489 | 10/1984 | Blankenship et al. . |
| 4,486,212 | 12/1984 | Berkey . |
| 4,494,968 | 1/1985 | Bhagavatula et al. . |
| 4,494,969 | 1/1985 | Bhagavatula . |
| 4,500,043 | 2/1985 | Brown . |
| 4,501,602 | 2/1985 | Miller et al. . |
| 4,514,205 | 4/1985 | Darcangelo et al. . |
| 4,528,009 | 7/1985 | Sarkar . |
| 4,531,959 | 7/1985 | Kar et al. . |
| 4,549,781 | 10/1985 | Bhagavatula et al. . |
| 4,561,871 | 12/1985 | Berkey . |
| 4,578,097 | 3/1986 | Berkey . |
| 4,592,619 | 6/1986 | Weidel . |
| 4,636,405 | 1/1987 | Mensah et al. . |
| 4,662,307 | 5/1987 | Amos et al. . |
| 4,671,938 | 6/1987 | Cook . |
| 4,692,615 | 9/1987 | Mensah et al. . |
| 4,704,151 | 11/1987 | Keck . |
| 4,715,679 | 12/1987 | Bhagavatula . |
| 4,718,929 | 1/1988 | Power et al. . |
| 4,750,802 | 6/1988 | Bhagavatula . |
| 4,751,441 | 6/1988 | Lewis . |
| 4,763,970 | 8/1988 | Berkey . |
| 4,831,315 | 5/1989 | Hammond et al. . |
| 4,852,122 | 7/1989 | Nelson et al. ........................... 375/222 |
| 4,857,884 | 8/1989 | O'Malley et al. . |
| 4,939,723 | 7/1990 | Harley, Jr. et al. . |
| 4,972,483 | 11/1990 | Carey . |
| 5,040,188 | 8/1991 | Lang et al. . |
| 5,105,292 | 4/1992 | Le Roy et al. . |
| 5,123,012 | 6/1992 | Suzuki et al. ........................... 370/379 |
| 5,144,465 | 9/1992 | Smith . |
| 5,162,937 | 11/1992 | Heidemann et al. . |
| 5,176,728 | 1/1993 | Fugate et al. . |
| 5,224,183 | 6/1993 | Dugan . |
| 5,351,239 | 9/1994 | Black et al. . |
| 5,371,813 | 12/1994 | Artigue . |
| 5,477,224 | 12/1995 | Sinnock . |
| 5,483,277 | 1/1996 | Granger . |
| 5,486,489 | 1/1996 | Goldstein et al. . |
| 5,497,260 | 3/1996 | Jurek et al. . |
| 5,497,264 | 3/1996 | Bayart et al. . |
| 5,497,385 | 3/1996 | Schmuck . |
| 5,500,755 | 3/1996 | Sierens et al. . |
| 5,502,586 | 3/1996 | Ohnsorge . |
| 5,504,827 | 4/1996 | Schimpe . |
| 5,506,723 | 4/1996 | Junginger . |
| 5,509,952 | 4/1996 | Moore et al. . |
| 5,510,926 | 4/1996 | Bayart et al. . |
| 5,517,232 | 5/1996 | Heidemann et al. . |
| 5,521,752 | 5/1996 | Heidemann et al. . |
| 5,521,909 | 5/1996 | Holloway et al. . |
| 5,521,914 | 5/1996 | Mavraganis et al. . |
| 5,522,007 | 5/1996 | Drouart et al. . |
| 5,528,283 | 6/1996 | Burton . |
| 5,539,734 | 7/1996 | Burwell et al. . |
| 5,544,192 | 8/1996 | Pfeiffer . |
| 5,544,272 | 8/1996 | Carratt et al. . |
| 5,546,378 | 8/1996 | Wirth et al. . |
| 5,546,414 | 8/1996 | Pfeiffer . |
| 5,550,667 | 8/1996 | Krimmel et al. . |
| 5,555,338 | 9/1996 | Haag et al. . |
| 5,557,439 | 9/1996 | Alexander et al. ........................... 359/130 |
| 5,561,553 | 10/1996 | Marcerou et al. . |
| 5,563,876 | 10/1996 | Duxbury et al. . |
| 5,567,794 | 10/1996 | Barraud et al. . |
| 5,570,218 | 10/1996 | Sotom . |
| 5,572,347 | 11/1996 | Burton et al. . |
| 5,572,614 | 11/1996 | Lucas, Jr. . |
| 5,574,816 | 11/1996 | Yang et al. . |
| 5,576,874 | 11/1996 | Czerwiec et al. . |
| 5,590,233 | 12/1996 | Carratt et al. . |
| 5,594,576 | 1/1997 | Sutherland et al. . |
| 5,594,823 | 1/1997 | Tardy et al. . |
| 5,595,669 | 1/1997 | Le Bris . |
| 5,598,493 | 1/1997 | Bonham, Jr. et al. . |
| 5,598,498 | 1/1997 | Comezzi . |
| 5,600,473 | 2/1997 | Huber . |
| 5,612,805 | 3/1997 | Fevrier et al. . |
| 5,612,808 | 3/1997 | Audouin et al. . |
| 5,613,023 | 3/1997 | Guillon et al. . |
| 5,621,842 | 4/1997 | Keller . |
| 5,625,728 | 4/1997 | Tardy et al. . |
| 5,625,735 | 4/1997 | Di Maggio et al. . |
| 5,629,994 | 5/1997 | Huber et al. . |
| 5,633,973 | 5/1997 | Vincent et al. . |
| 5,636,308 | 6/1997 | Personne et al. . |
| 5,640,268 | 6/1997 | Chesnoy . |
| 5,647,884 | 7/1997 | Overton et al. . |
| 5,649,038 | 7/1997 | Boniort et al. . |
| 5,649,043 | 7/1997 | Adams et al. . |
| 5,650,231 | 7/1997 | Barraud et al. . |
| 5,652,808 | 7/1997 | Duchet et al. . |
| 5,655,040 | 8/1997 | Chesnoy et al. . |
| 5,661,553 | 8/1997 | Auge et al. . |
| 5,661,585 | 8/1997 | Feldman et al. . |
| 5,661,833 | 8/1997 | Omati . |
| 5,663,818 | 9/1997 | Yamamoto et al. . |
| 5,668,652 | 9/1997 | Hashomoto et al. . |
| 5,673,129 | 9/1997 | Mizrahi . |
| 5,673,352 | 9/1997 | Bauer et al. . |
| 5,682,454 | 10/1997 | Gaillard . |
| 5,684,297 | 11/1997 | Tardy . |
| 5,687,014 | 11/1997 | Czerwiec et al. . |
| 5,687,041 | 11/1997 | Lee et al. . |
| 5,689,607 | 11/1997 | Vincent et al. . |

OTHER PUBLICATIONS

Data Sheet, "200 GHz Channel Spacing Dense Wavelength Division Multiplexer DWDM–2 Series," Oplink Communications, Inc., (undated).

Data Sheet, "Wavelength Division Wideband Bandsplitter WDBS–15 Series," Oplink Communications, Inc., (undated).

Data Sheet, "200 GHz Wavelength Division Add/Drop Multiplexer WADM–2 Series," Oplink Communications, Inc., (undated).

Data Sheet, "Customer Product Specification," Alcatel, (undated).

Data Sheet, "LG1600FXH Clock and Data Regenerator," Microelectronics Group, Lucent Technologies, (Feb. 1997).

Data Sheet, "LG1605DXB Limiting Amplifier," Microelectronics Group, Lucent Technologies, (Feb. 1997).

Data Sheet, "FRM5W231DR 2.5 Gb/s APD Detector Preamp," Lightwave Components & Modules Catalog, Fujitsu, p. 114–117, 133 (undated).

Data Sheet, "FMM311CG/DG GaAs Integrated Circuit Laser Driver," Lightwave Components & Modules Catalog, Fujitsu, p. 134–137, (1997).

Press Release, "Osicom's Dense Wavelength Division Multiplexer (DWDM) Breaks Price Barrier for Metropolitan Service Providers," Osicom Technologies, Inc., (Nov. 24, 1997).

Presentation, "Osicom Technologies—GigaMux Introduction," originally submitted as part of AS Brochure, Osicom Technologies, (Jun. 24, 1997).

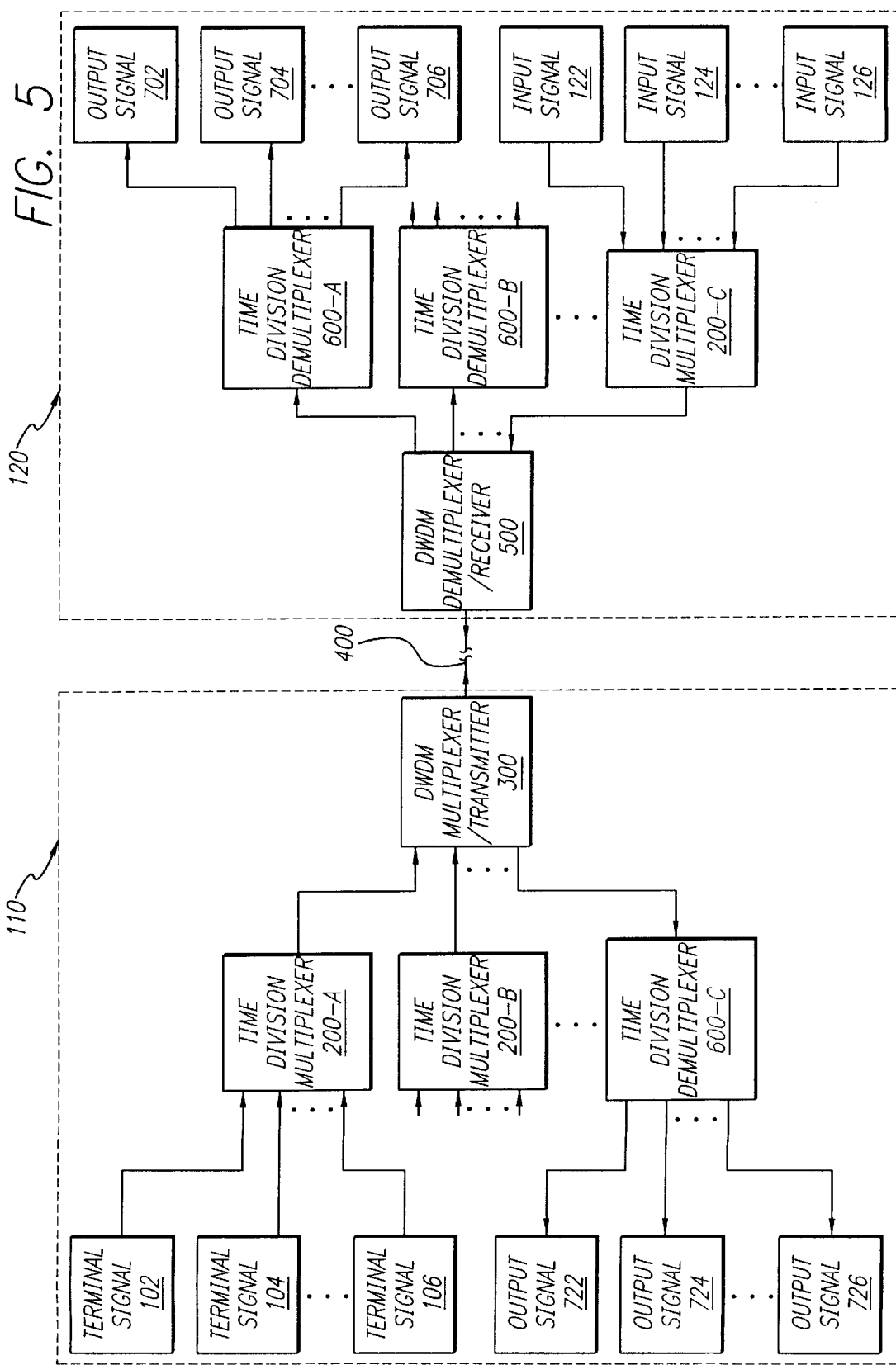

TIME DIVISION MULTIPLEXING EXPANSION SUBSYSTEM

TECHNICAL FIELD OF THE INVENTION

The present invention relates to time division multiplexing (TDM) subsystems which transmit multiple channels of information on a single channel of a Dense Wavelength Division Multiplexing (DWDM) system, and accommodates a variety of data formats and data rates.

BACKGROUND OF THE INVENTION

Telecommunications and data communications systems represent a substantial and rapidly growing portion of the communications industry. Such growth has been particularly intense in the past ten years. Unfortunately, the current system capacity is far too limited for these rapidly expanding applications, particularly optical fiber systems. It is quite expensive to construct new fiber optic lines. Thus, various methods have been considered for increase the system capacity, such as optical dense wavelength division multiplexing (DWDM), frequency division multiplexing (FDM), and time division multiplexing (TDM).

In a DWDM system, multiple optical signal channels are carried over a single optical fiber, each channel being assigned a particular optical wavelength. By using a single, existing optical fiber to carry multiple channels, DWDM has been found to be an efficient approach for increasing the capacity of the current communication systems and better utilizing the existing transmission media, optical fiber.

Each channel in current DWDM systems can carry data at speeds up to about 2.5 Gb/s to 10 Gb/s. This works well for data that is being transmitted at such speeds, however it is obviously quite inefficient to use a channel capable of 10 Gb/s to transmit a signal at a substantially lower data rate (often lower than 500 Mb/s). For instance, input signals in the STS-1 format are typically transmitted at about 51.84 Mb/s, while data in the FDDI and Ethernet formats are usually transmitted at about 100 Mb/s, data in the ATM, Fiber Channel and STS-3 formats at about 155 Mb/s, data in the ESCON format about 200 Mb/s, and data in other audio-videodata mixed transmission formats may range from about 150 Mb/s to 200 Mb/s. Thus valuable fiber-optic bandwidth is being employed to transmit far less information than capacity would indicate. What is needed is to find some means to efficiently transport signals with working speeds of about 50 Mb/s to 500 Mb/s on a DWDM system.

TDM modules have been employed in an attempt to avoid such inefficiency. At the transmitting end of a TDM system, an electronic switch (multiplexing unit) picks up signals from each of multiple input channels, in a predetermined "channel-by-channel" order. A resulting multiplexed signal, which combines such input signals, is constructed and forms the "output" or transmitting end of the TDM. Ideally, the output signal is transmitted at the combined speeds of the various input signals. The multiplexed signal is distributed to receiving terminal equipment as the output of transmitting end of the module. Such receiving terminal equipment includes devices made by 3Com, Cisco, Hewlett-Packard, IBM, Alcatel, Amp, Lucent, Tektronix, and Osicom. Generally, output signals are sent to the same kind of terminal equipment as provided the initial input signal.

Prior art TDM modules were designed for to work only with a single, fixed data format. For example, some modules were designed to operate only with data in the FDDI format, while others work only in the Ethernet format, and still others only with one of the remaining formats, such as SDH/SONET ATM, Fiber Channel, and others. Thus systems in which data in a variety of formats must be transmitted cannot use prior art TDM systems. Furthermore, such prior art TDM systems required expensive and complicated format-specific terminal equipment.

Many prior art TDM modules are not capable of adjusting to differing data rates and have to be specially designed for multiplexing at only a single specified rate. Thus such units have limited usefulness in modern communications networks, which often must transmit data of varying data formats and at differing speeds. To overcome this problem, some prior art TDM modules have included a data rate adjustment feature. Unfortunately this is not a true adjustment of the modules data rate, but rather a modification of the input signal to meet some standard data rate. Typically this means that the input signal must either be supplied with redundant data to increase the data rate or some data from the signal will be removed to reduce the signal data rate. The former may work, but at the expense of transmitting unwanted data, wasting scarce waveband, and the later will degrade the performance of the input signal. Another attempt to overcome this problem has been to design units capable of handling either a specified data rate or an even multiple of that rate ("step-by-step"). For example, a unit has been designed that can accept data in both the STS-1 and STS-3 formats (respectively 51.84 Mb/s and 155.52 Mb/s, the later being exactly three times the former). Obviously, such a system is quite limited.

Some prior art systems use a "header" to identify a particular channel. Unfortunately, such headers must typically be lengthily, and thus result in an unnecessarily (and wastefully) high data rate to transmit both the header and the underlying signal before available buffer space has been exhausted.

Furthermore, some prior art units are prone to error when if any of the TDM channels are temporarily inactive. Such problems are often due to the inability to determine the signal horizon in the event of a null signal (repeating zeros) as well as certain other repetitive signals (e.g., repeating 1's and/or 0's: "001100110011 . . . " etc.).

Some of prior art TDM modules require the input signals operate on one-fifth of the data rate which the module components can handle, due to the use of an independent system clock. Such units either operate on lower data rate or require the very expensive working components that are capable of handling such high data rates (i.e., five times the actual data transfer rate).

An additional problem with prior art TDM modules, designed for existing network and terminal equipment, is that any change in equipment, such as replacing the module, required that both the TDM system and the DWDM system be shut down.

What is needed is a TDM expansion module adapted for use in a DWDM system, which can handle data in numerous formats, that is expandable, can handle data at higher transmission speeds (form 50 Mb/s to 500 Mb/s), achieves this result at a minimal cost in terms of data loss, functionality, and reliability.

SUMMARY OF THE INVENTION

The present invention provides an expansion subsystem for dense wavelength division multiplexing systems allowing for the time division multiplexed transmission of lower speed information-bearing signals without regard to data rate or transmission format.

In a first aspect, the present invention provides a modular time division multiplexing expansion subsystem for transmitting a plurality of incoming information-bearing signals between a first station and a second station over a single transmission medium, including a first station with at least one multiplexer module, including a plurality of data buffers which receive incoming information-bearing signals and derive a respective input clock signal therefrom; a channel identification generator, generating a unique pseudo-random channel identification code for each of said respective signals independent of any channel identification encoded in said signals; a plurality of encoders, sequentially adding different bits from the unique code to the signal at predetermined intervals, independent of any frame or synchronization signal within said signal, to form an encoded data signal having a faster data rate than said respective signal; a plurality of data scramblers, converting the encoded signal into a format that can be directly modulated, transmitted and demodulated without signal boosters or amplification, according to a predetermined algorithm; a time division multiplexing unit, combining output signals from said scramblers, sequentially transferring an output signal from each scrambler at different time slot, and forming a time division multiplexed signal for transmission from said first station to said second station; and a multiplexing clock, for receiving data speed in the form of signals from one or more of the data buffers, and transmitting synchronizing pulses to the channel identification generator, the plurality of data scramblers, and the time division multiplexing unit; a second station including at least one demultiplexer module comprising a time division demultiplexing unit, located at the second station, for dividing the signal from the first station, deriving the data speed therefrom, and transmitting demultiplexed signals over a plurality of data channels; a plurality of unscramblers, one for each data channel, receiving the demultiplexed signal and converting it back into an encoded data signal; a demultiplexing clock, for receiving data speed in the form of signals from the time division demultiplexer, and transmitting at least one synchronous pulse based thereupon; a decoder for receiving said synchronous pulse, removing said unique identification code from said signal, and returning the signal substantially to its original form; an identification verifying unit, comparing the unique identification code from a given signal with the predetermined code for that signals data channel, sending a synchronizing signal to said time division demultiplexing unit if said identification code from said signal does not correspond to said predetermined for that signals data channel; wherein said informationbearing signals may be transmitted between a first station and a second station over a single transmission media independent of transmission format.

In other aspects of the present invention, the data buffers, encoders, scramblers, channel identification generator, and time division multiplexing unit are able to operate over a wide range of data rates; the channel identification generator and identification verifying unit are substantially identical in structure; the second station further comprises at least one time division multiplexer, and the first station further comprises at least one time division demultiplexer, allowing for bidirectional operation; the plurality of encoders add at least a first predetermined integer number of bits from the unique channel identification code after every second predetermined integer number of bits of said respective signal; the first predetermined integer number is one and said second predetermined integer number is eight; the data scrambler predetermined algorithm further comprises converting said respective signal by an Exclusive OR algorithm based upon predetermined binary number; the predetermined binary number is at least seven bits in length; the plurality of data buffers include a first data buffer, a second data buffer and one or more subsequent data buffers, and if the multiplexing clock has not acquired data speed or lost data speed, the clock initially checks said first data buffer for data speed, and if no data speed is acquired, then checks said second data buffer, and if no data speed is acquired, in turn checks subsequent data buffers, repeating the pattern, until data speed is acquired; the data scrambler further comprises a single chip with said Exclusive OR algorithm and said binary number contained therein; the unique pseudo-random channel identification codes are stored in a shift registrar or in read-only memory; the information-bearing signals received by said multiplexer module are at substantially the same data rate; the multiplexer module further comprises a plurality of multiplexer modules wherein the output of at least one multiplexer module forms the input of another multiplexer module, in cascade fashion to accommodate a greater number of incoming information-bearing signals than a single multiplexer module could accommodate; and the demultiplexer module further comprises a plurality of demultiplexer modules wherein at least one of said demultiplexed signals, output from at least one demultiplexer module, forms the input of another demultiplexer module, in cascade fashion, to accommodate a greater number of incoming information-bearing signals than a single demultiplexer module could accommodate.

BRIEF DESCRIPTION OF THE DRAWINGS

FIG. 5 schematically depicts a communication system with the TDM subsystem arranged for bidirectional communications.

DETAILED DESCRIPTION OF THE INVENTION

Figure 1:
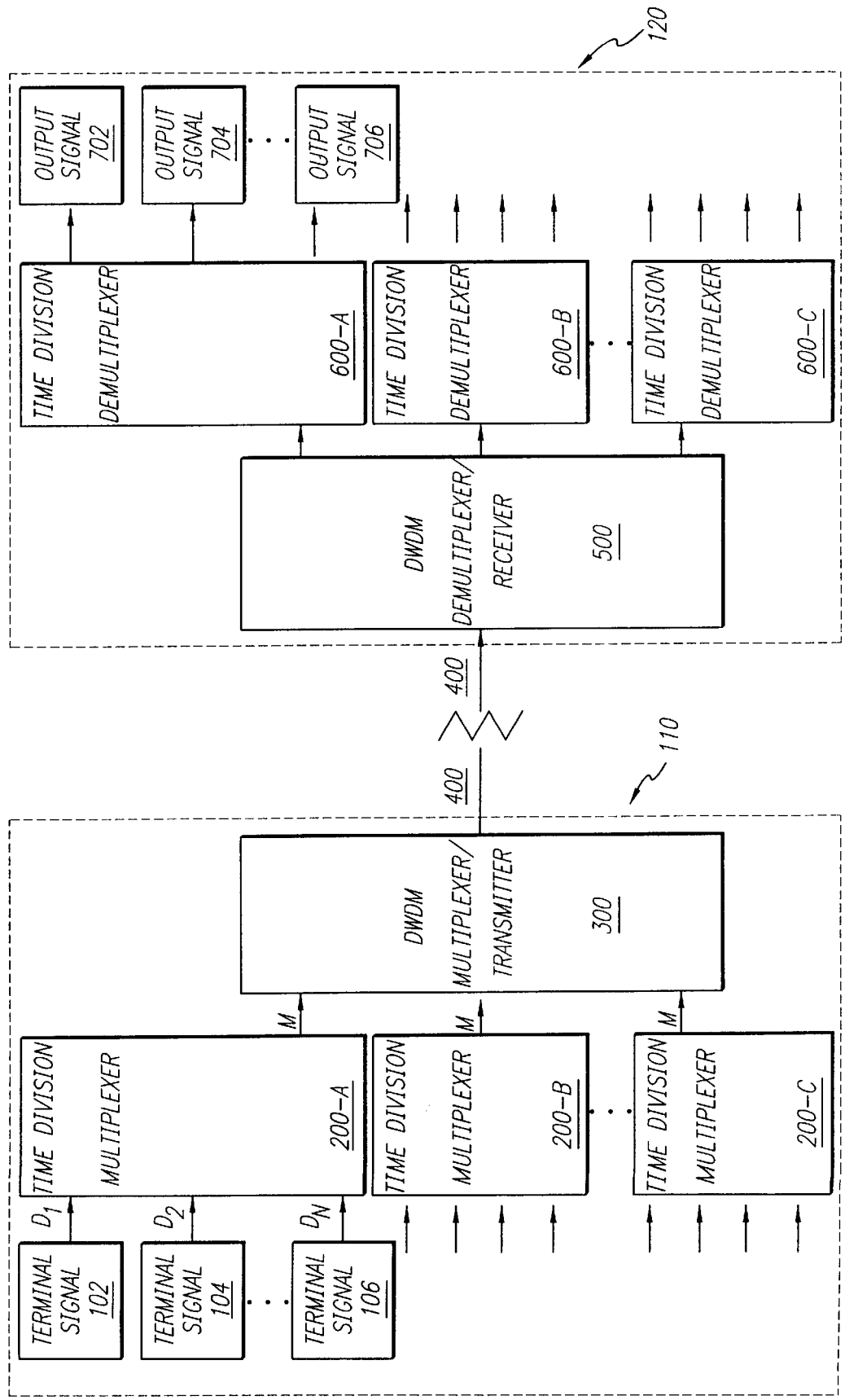
FIG. 1 schematically depicts a communication system with the TDM subsystem constructed according to the present invention.

FIG. 1 depicts the time division multiplexing (TDM) data transmission system 100 constructed according to the present invention. The TDM data transmission system includes a transmitting station 110 and a receiving station 120. The transmitting station 110 includes and is interconnected to two or more terminal signals, such as terminal signal 102, terminal signal 104, and terminal signal 106, which form the input of the system. The input signals may be telecommunication or data communication signals in virtually any format, such as the FDDI, Ethernet, Fiber Channel, ESCON, ATM, and SDH formats. The signal are generally produced by one of any number of signal sources, such as commercially available signal generators by 3Com, Cisco, Alcatel, Lucent, Tektronix, and Osicom. For simplicities sake, only three terminal signals (102, terminal signal 104 and 106) are shown. However, additional terminal signals can be accommodated.

Groups of terminal signals (e.g., 102, 104 and 106) are combined together by a single time division multiplexer, such as time division multiplexer 200-A. Time division multiplexers adequate for this application are commercially available from such vendors as Vitesse. Additional time division multiplexers, for example time division multiplexers 200-B and 200-C, may also be included, each connected to their own group of terminal signals (shown only as arrows). The combined signals are then sent to DWDM multiplexer/transmitter 300, which combines the combined signals from different time division multiplexers (such as time division multiplexers 200-A, 200-B, and 200-C), perhaps with optical or electronic signals from other sources (not shown). A variety of DWDM multiplexer/transmitters are commercially available from a number of sources, including Osicom. The newly DWDM multiplexed signal is then passed through optical waveguide medium, such as optical fiber 400, which transports the signal to the receiving station 120, which includes a DWDM demultiplexer/receiver 500. DWDM demultiplexer/receiver 500 is similarly commercially available from a number of sources, including Osicom. The DWDM demultiplexer/receiver 500 separates the multiplexed signals by wavelength, segregating the signals from individual time division multiplexers, such as time division multiplexers 200-A, 200-B, and 200-C, as well as optical or electronic signals from other sources (not shown). The signals from a given time division multiplexer are sent to a counter-part time division demultiplexer, so that, for example, signals from time division multiplexer 200-A are sent by the DWDM demultiplexer/receiver 500 to time division demultiplexer 600-A, while those from time division multiplexer 200-B are sent to time division demultiplexer 600-B, and time division multiplexer 200-C to time division demultiplexer 600-C. Time division demultiplexers may be obtained from the same vendors as time division multiplexers.

The transmitting station 110 may have any number of time division demultiplexers, but for simplicities sake, focus will be on time division demultiplexer 600-A. Time division demultiplexer 600-A reverses the process of time division multiplexer 200-A and divides the output signals. Thus each terminal signal (such as terminal signal 102) is recovered from the multiplexed signals and restored to its original form. For instance, terminal signal 102 is restored as output signal 702, terminal signal 104 as output signal 704, and terminal signal 106 as output signal 706.

Figure 2:
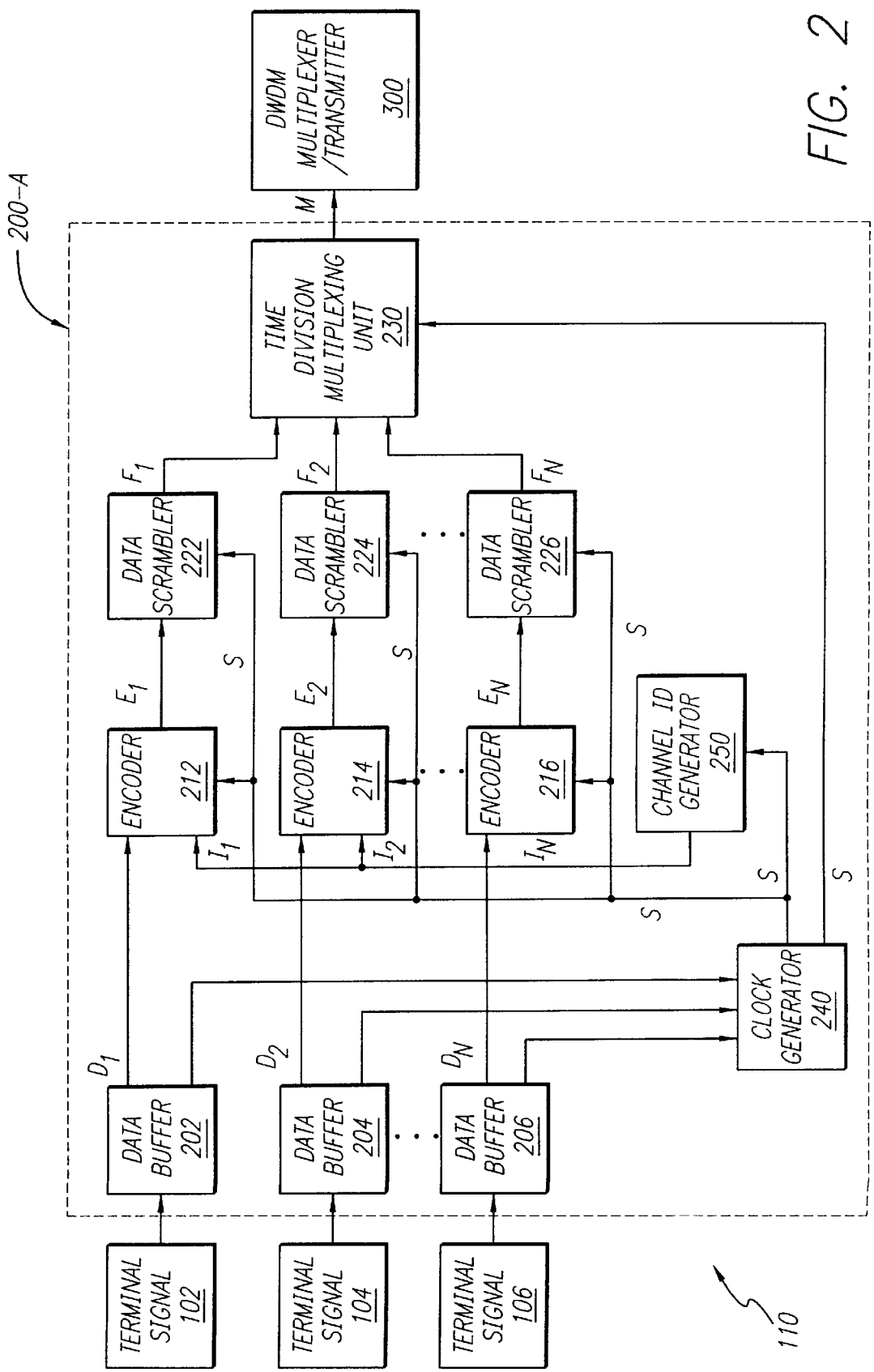
FIG. 2 schematically depicts the transmitting end of the TDM subsystem in FIG. 1.

Referring to FIG. 2, the transmitting station 110 of the TDM data transmission system 100 is shown, which includes terminal signals, such as terminal signal 102, terminal signal 104, and terminal signal 106, time division multiplexer 200-A and DWDM multiplexer/transmitter 300. Time division multiplexer 200-A is shown in some detail and includes a data buffer for each terminal signal, such as data buffer 202, data buffer 204, and data buffer 206, for processing terminal signals 102, 104 and 106, momentarily storing data until clock is acquired and for determinating the data speed from the terminal signal and communicating it to a clock generator 240. Appropriate clock generators and data buffers are commercially available from vendors such as Motorola and National Semiconductor. In a preferred embodiment, the data buffer has a memory capability of eight bytes. Each data buffer's output (labeled $D_{1,2,\ldots N}$) is transmitted to an encoder, such as encoders 212, 214, and 216. Appropriate encoders are commercially available from vendors such as Motorola and National Semiconductor.

Thus, data buffer 202's output (labeled $D_1$) is transmitted to encoder 212, data buffer 204's output (labeled $D_2$) is transmitted to encoder 214, and data buffer 206's output (labeled $D_N$) is transmitted to encoder 216. The encoders (212, 214 and 216) add an identification signal supplied by a channel ID generator 250 to the terminal signal. Suitable channel ID generators are commercially available from suppliers such as Motorola and National Semiconductor. Each encoder's output (labeled $E_{1,2,\ldots N}$) is transmitted to a data scrambler, such that encoder 212's output (labeled $E_1$) is transmitted to data scrambler 222, encoder 214's output (labeled $E_2$) is transmitted to data scrambler 224, and encoder 216's output (labeled $E_N$) is transmitted to data scrambler 226. The data scramblers (222, 224 and 226) alter the output of the encoders according to a preset algorithm to avoid unrecognizable data (discussed below). Such data scramblers are commercially available from suppliers like Motorola and National Semiconductor.

The time division multiplexing unit 230 combines the output signals (labeled $F_{1,2,\ldots N}$) from the various data scramblers together by sequentially picking up each output signal at different time slot, one bit at a time, and forming a time division multiplexed signal (labeled M) which is transmitted to the DWDM multiplexer/transmitter 300. The DWDM multiplexer/transmitter 300 may also receive as inputs other time division multiplexed signals (not shown) from other time division multiplexers, such as time division multiplexer 200-B and time division multiplexer 200-C, as well as signals from other optical and electronic sources. The time division multiplexing unit 230 is commercially available from any number of sources, such as Vitesse. The DWDM multiplexer/transmitter 300 combines all of these signals onto a single optical waveguide, such as optical fiber 400, which transports the combined signal to a receiving station.

The clock generator 240 receives the data speed of the input signal from the data buffers (e.g., 202, 204 and 206) and generates a main system clock, in the form of synchronous pulses, based upon the speed of the input signal, to control that time division multiplexer (e.g., 200-A). The synchronous pulses are sent to the encoders (212, 214, and 216), the data scramblers (222, 224 and 226), the channel ID generator 250, and the time division multiplexing unit 230. The synchronous pulses sent to the various components may be a different speeds, depending upon the component. For example, because the encoders add a data bit to the signals (see below) a faster pulse is required to that component. In a preferred embodiment, the clock will initially read data speed from data buffer 202. If a data speed is readable from that buffer, the clock will transmit the synchronous pulse described above. If no data speed is readable from data buffer 202 (perhaps, for instance, if that channel is not operational or has no data), the clock generator 240 will next attempt to read data buffer 204, and repeat the same process until it acquires data speed from one of the buffers. If that buffer subsequently loses data speed (again, perhaps that channel temporarily has no signal) the clock generator 240 will continue to repeatedly check other buffers until an operational one is found. If all buffers are non-operational, the clock generator 240 will generate an artificial system clock, until one of the buffers has a signal.

The channel ID generator 250 generates a unique channel ID (labeled $I_{1,2,\ldots N}$) for the marking of each channel by the encoders (212, 214, and 216). Typically, this is in the form of unique pseudo-random onehundred and twenty seven (127) bit numbers sent to each encoder. Such numbers may be stored in a shift register or read-only memory, or in other means, by the channel ID generator 250. For instance, ID $I_1$ is sent to encoder 212, ID $I_2$ is sent to encoder 214, and ID $I_N$ is sent to encoder 216. In a preferred embodiment, the encoder will insert one bit of the pseudo-random number every eight bits of the data buffer's output (labeled $D_{1,2,\ldots N}$).

The data scramblers (222, 224 and 226) each utilize an Exclusive OR algorithm based upon a different binary number for each scrambler. The binary numbers must be of sufficient length and diversity to assure that they will not likely be duplicated in the data buffer's output. It has been found that a seven bit binary is usually adequate for this purpose. The binary and the Exclusive OR algorithm (as well as the necessary output hardware) can be impressed upon a single chip, which can also be used to unscramble the data at the receiving station 120. Thus the data scrambler 222 will avoid data recognition problems caused by a null signal (repeating zeros) as well as other signals (repetitive 1's, "001100110011 . . . " etc.) where the signal horizon is difficult to determine. Indeed, as noted below, since clock acquisition on the receiving end is based upon the signal speed, and the channel ID is embedded within the signal, making such a determination is highly important to the functioning of the TDM data transmission system.

Figure 3:
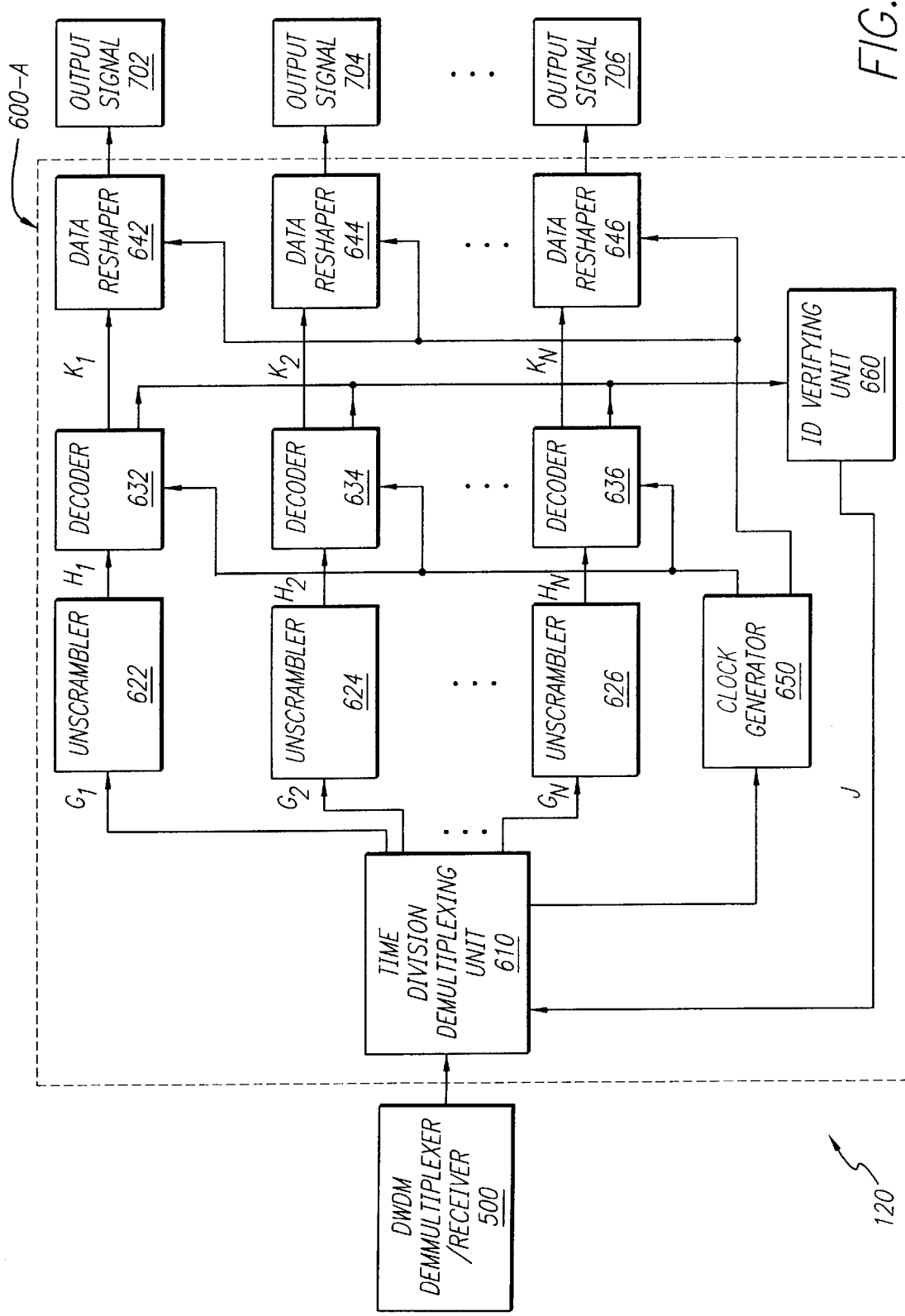
FIG. 3 schematically depicts the receiving end of the TDM subsystem in FIG. 1.

Referring to FIG. 3, the receiving station 120 of the TDM data transmission system is shown, which includes a DWDM demultiplexer/receiver 500, a time division demultiplexer 600-A, and output signals, such as output signal 702, output signal 704 and output signal 706. Time division demultiplexer 600-A segregates out signals from individual time division multiplexing units (such as time division multiplexing unit 230) and transmits them as respective output signals (such as output signals 702, 704, and 706).

Time division demultiplexer 600-A is shown in some detail and includes a time division demultiplexing unit 610 for dividing the multiplexed signals received from a time division multiplexing unit (e.g., time division multiplexing unit 230 shown in FIG. 2) and for transmitting such individual signals (labeled $G_{1,2,\ldots N}$) one bit at time to respective unscramblers (i.e., 622, 624, 626) on a rotating basis, acquiring clock and receiving a synchronization signal from a channel ID verifying unit 660, such as those available from Motorola and National Semiconductor. Each unscrambler (i.e., 622, 624, 626) utilizes the same Exclusive OR algorithm, based upon the same respective binary numbers, as does the data scrambler whose output is being unscrambled (that is, unscrambler 622 and data scrambler 222 use the same binary, as do unscrambler 624 and data scrambler 224, as well as unscrambler 626 and data scrambler 226). In fact, in a preferred embodiment the same binary can be used for all the scramblers and unscramblers. Each unscrambler outputs a data signal (labeled $H_{1,2,\ldots N}$) to a respective decoder (632, 634, and 336), which reads and removes the channel ID generated by the channel ID generator 250 and added by the encoders (212, 214, and 216) in FIG. 2. Suitable unscramblers and decoders are commercially available from vendors such as Motorola and National Semiconductor, and transmit the channel ID to the channel ID verifying unit 660. The channel ID verifying unit 660 compares the channel ID from each decoder with the pre-stored channel ID assigned to that decoder. If the channel ID matches, no action is taken by the channel ID verifying unit 660. If they do not match, indicating that the particular signal is in the wrong channel (e.g., signal $H_1$ misdirected to decoder 634), the channel ID verifying unit 660 sends a re-synchronization signal (labeled J) to the time division demultiplexing unit 610 to skip a channel a single time in the demultiplexing process. Then the channel ID verifying unit 660 again compares the channel ID to the pre-stored channel ID assigned to that channel. If there is a match, no further action is taken. If not, then the process of sending re-synchronization signal J to the time division demultiplexing unit 610 is repeated until the channel ID from each from each decoder matches the pre-stored channel ID assigned to that decoder.

The output signals from the decoders (labeled $K_{1,2,\ldots N}$) are transmitted to respective data reshapers (642, 644, 646), such as Motorola model no. MC10H131. The waveform of signals $K_{1,2,\ldots N}$ will sometimes be distorted by noise such as thermal noise, shot noise, inter crosstalk, system bandwidth, etc. The data reshapers translate the decoded signals to their original signal waveform, and such "clean" signals form output signals 702, 704 and 706

The clock generator 650 receives clock from the time division demultiplexing unit 610, based upon the rate of the input signal, and provides a clock pulse to the decoders (632, 634, and 636) and the data reshapers (64, 644, and 646). Suitable clock generators are commercially available from vendors such as Motorola and National Semiconductor.

Figure 4:
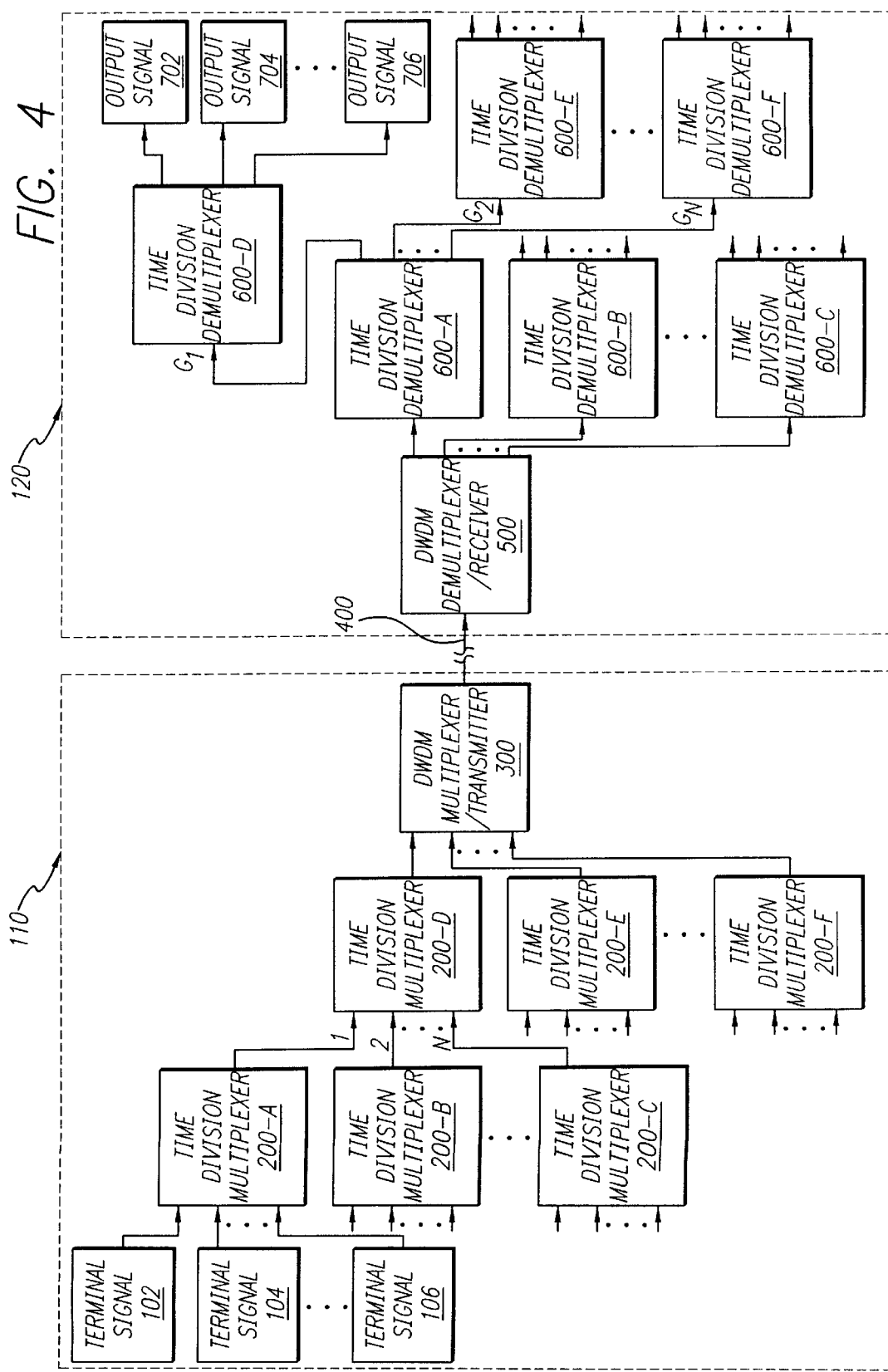
FIG. 4 schematically depicts a communication system with the TDM subsystem arranged in a multi-level cascade combination.

The multi-level applications of the TDM data transmission system 100 of the present invention can be further seen by viewing FIG. 1 along side FIG. 4, which shows an embodiment in which time division multiplexers 200-A, 200-B, and 200-C, are cascaded, that is, they transmit their respective output signals (such as, for example, terminal signals 102, 104, and 108 multiplexed into a single signal by time division multiplexer 200-A) to time division multiplexer 200-D, which then combines them and transmits the resultant multiplexed signal to DWDM multiplexer/transmitter 300, which may also receive other multiplexed signals from other time division multiplexers, such as time division multiplexers 200-E and 200-F. DWDM multiplexer/transmitter 300 combines those signals and transmits the resultant signal over optical fiber 400 to DWDM demultiplexer/receiver 500, which demultiplexes those signals and transmits the resultant separate signals to time division demultiplexers, such as time division demultiplexers 600-A, 600-B, and 600-C. Time division demultiplexer 600-A demultiplexes the signal into separate signals and transmits such separate signals to time division demultiplexers 600-D, 600-E, and 600-F. Time division demultiplexer 600-D, by way of example, further demultiplexes the signal from time division demultiplexer 600-A into separate output signals, such as output signals 702, 704, and 706.

Figure 6A:
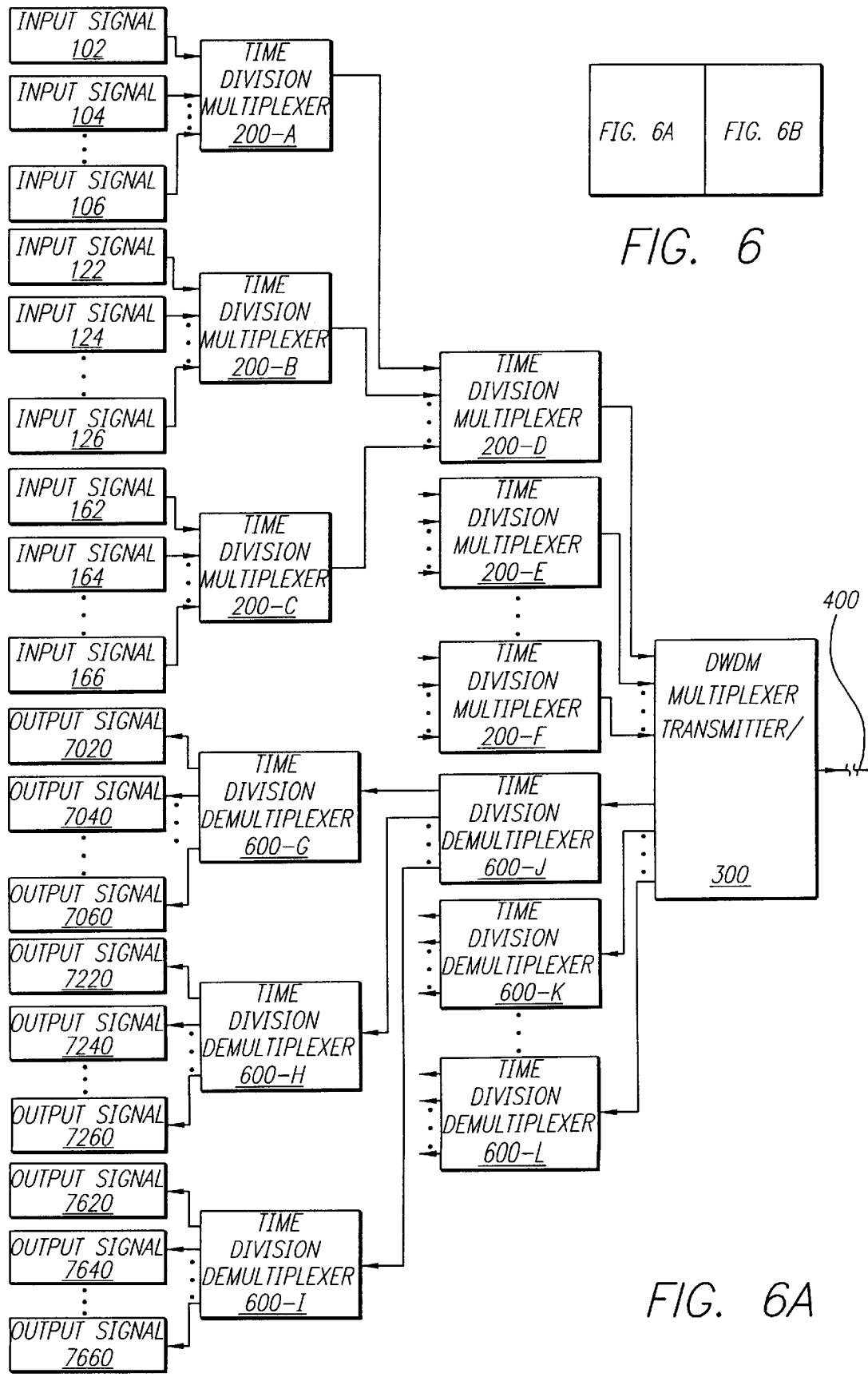
FIGS. 6-A & 6-B schematically depict a communication system with the TDM subsystem arranged for bidirectional communications in a multilevel cascade combination, with FIG. 6-A showing the transmitting station and FIG. 6-B the receiving station.
Figure 6B:
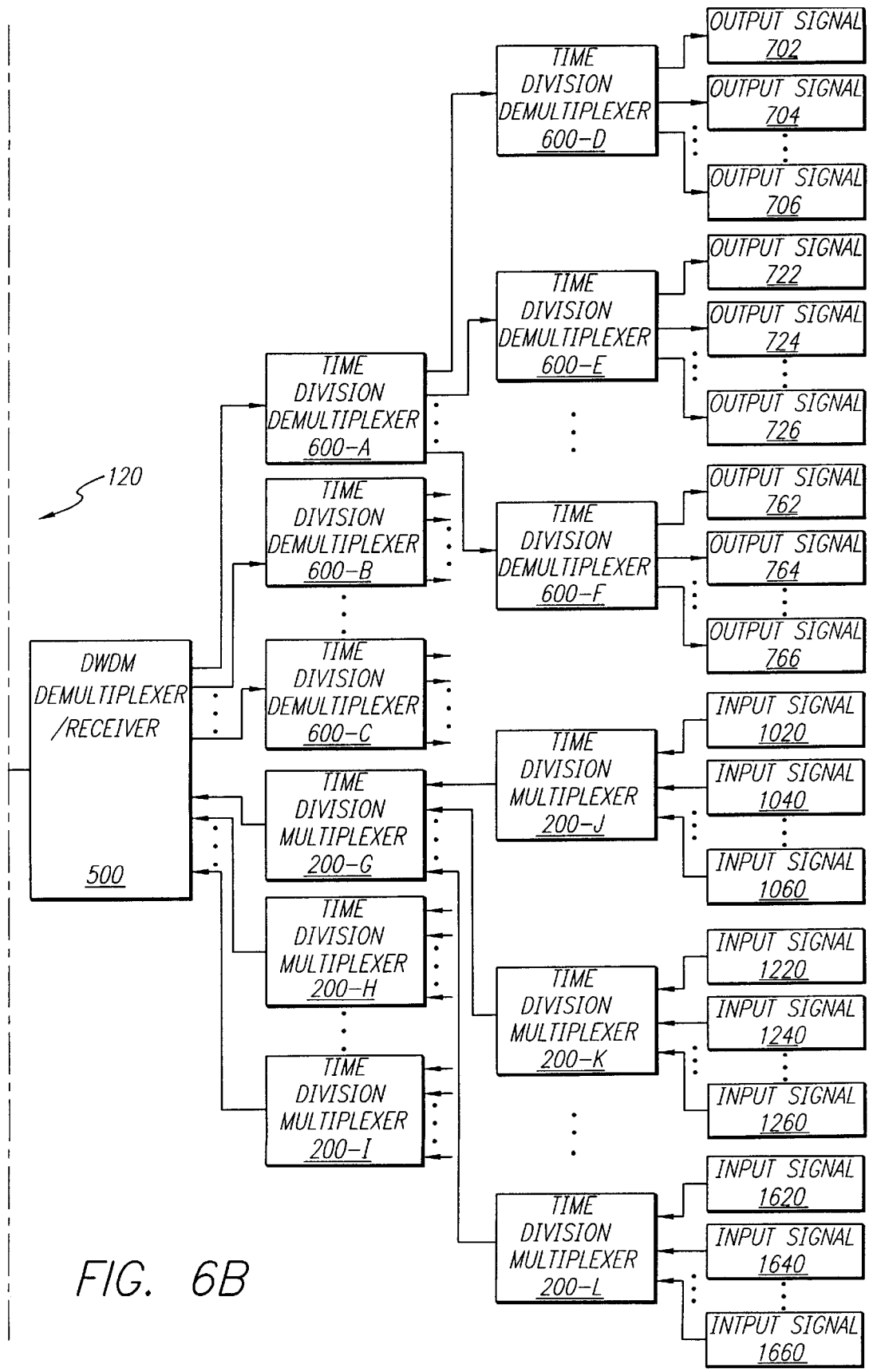

FIG. 5 shows an embodiment allowing bidirectional operation of the TDM data transmission system of the present invention. Viewing FIG. 1 along side FIG. 5, the DWDM multiplexer/transmitter 300, optical fiber 400, and DWDM demultiplexer/receiver 500 are capable of bidirectional communication. Thus all that need be done is, at the transmitting station 110, to replace time division multiplexer 200-C (FIG. 1) with time division demultiplexer 600-C (FIG. 5), and at the receiving station 120, replace time division demultiplexer 600-C (FIG. 1) with time division multiplexer 200-C (FIG. 5). The result of this substitution is that while time division multiplexers 200-A and 200-B function just as shown in FIG. 1, to transmit data from terminal signals (for example 102, 104, and 106) through the optical fiber 400 to the DWDM multiplexer/transmitter 300 and eventually form output signals (for example, output signals 702, 704, and 706), time division multiplexer 200-C, though located at the "receiving station" 120 of the system, transmits input signals (such as input signals 122,124, and 126) in the reverse direction through. DWDM demultiplexer/receiver 500, optical fiber 400, DWDM multiplexer/transmitter 300, time division demultiplexer 600-C, and forms output signals (such as output signals 722, 724, and 726). The particular configuration shown (i.e., two time division multiplexers and one time division demultiplexer on what would be deemed in FIG. 1 to be the "transmitting station" 110) is by way of example only. A virtually unlimited number of configurations are possible depending upon the needs of the user. FIG. 6 shows a bidirectional embodiment of the cascade configuration of FIG. 5, in which what would be deemed the "transmitting station" 110 in FIG. 1 now contains six time division demultiplexers (600-G, 600-H, 600-I, 600-J, 600-K, and 600-L), and the former "receiving station" 120 contains six time division multiplexers (200-G, 200-H, 200-I, 200-J, 200-K, and 200-L), again allowing bidirectional transmission.

In these bidirectional embodiments, as well as the unidirectional embodiment shown in FIG. 1, the system will remain in operation when any one or more input signals (such as 102, 106 or 124, for example) are removed or added, or suspend or begin operation. The single scrambling process (e.g., data scrambler 222 and unscrambler 622 of FIGS. 2 and 3) treat such an event as suspended operation of a signal source as a null signal.

Having now described the invention in accordance with the requirements of the patent statutes, those skilled in the art will understand how to make changes and modifications in the present invention to meet their specific requirements or conditions. Such changes and modifications may be made without departing from the scope and spirit of the invention as set forth in the following claims.

What is claimed is:

1. A modular time division multiplexing expansion subsystem for transmitting a plurality of incoming information-bearing signals between a first station and a second station over a single wavelength channel of a wavelength division optical fiber transmission medium, said subsystem comprising a first station including at least one multiplexer module, said multiplexer module comprising:

a plurality of data buffers, each data buffer receiving a respective one of said incoming information-bearing signals, each incoming signal having an associated input data speed;

a channel identification unit for providing a unique channel identification code for each of said incoming information-bearing signals, independent of any channel identification encoded in the respective incoming information-bearing signal;

a plurality of encoders utilizing a plurality of different respective channel identification codes and sequentially adding different bits from each said code to a respective information-bearing signal at predetermined intervals, independent of any preexisting frame or synchronization portion of said information-bearing signal, to thereby form a respective encoded data signal having a faster data rate than said respective input data speed;

a plurality of data scramblers for formatting the data signals as respective scrambled output signals according to a predetermined scrambling algorithm such that the output signals can be directly modulated, transmitted and demodulated over the optical fiber transmission medium without signal boosters or amplification and each output signal has a signal horizon from which said faster data rate can be readily determined;

a time division multiplexing unit for sequentially combining each encoded and scrambled output signal in a different respective time slot of a time division multiplexed signal for transmission from said first station to said second station; and a multiplexing clock for outputting at least one synchronizing pulse at said faster data rate for use within said first station;

a second station including at least one demultiplexer module, each demultiplexer module comprising:

a time division demultiplexing unit, for dividing the time division multiplexed signal received from said first station, into a plurality of demultiplexed output signals, and transmitting the demultiplexed signals over a plurality of data channels at said faster data speed;

a demultiplexing clock for deriving at least one synchronizing pulse signal from said demultiplexed output signals;

a plurality of data unscramblers, responsive to said at least one receiver synchronizing pulse signal, each receiving a different respective demultiplexed signal from the time division demultiplexing unit and reformatting the demultiplexed signal in accordance with said predetermined scrambling algorithm into a respective encoded data signal;

a plurality of decoders responsive to said at least one receiver synchronizing pulse signal, each for removing a respective said identification code from a respective said encoded data signal, and returning the received encoded data signal substantially to its original form; and an identification verifying unit, for comparing said unique identification code from a given signal with the predetermined unique identification code for that signal's data channel, and for sending a synchronizing correction signal to said time division demultiplexing unit if said identification code from said given signal does not correspond to said predetermined identification code for that signal's data channel;

whereby different said information-bearing signals may be transmitted over said single channel independent of transmission format.

2. The modular time division multiplexing expansion subsystem of claim 1 wherein said data buffers, encoders, scramblers, channel identification generator, and time division multiplexing unit are able to operate over a wide range of data rates, whereby information-bearing signals may be transmitted between a first station and a second station over a single transmission medium substantially independent of data rate.

3. The modular time division multiplexing expansion subsystem of claim 1 wherein said channel identification generator and said identification verifying unit are substantially identical in structure.

4. The modular time division multiplexing expansion subsystem of claim 1 wherein said second station further comprises at least one multiplexer module for combining information-bearing signals and transmitting said multiplexed signal from said second station to said first station; and said first station further comprises at least one demultiplexer module for dividing said multiplexed signal received from said second station, whereby information-bearing signals may be transmitted from said second station to said first station, while other information-bearing signals continue to be transmitted from said first station to said second station.

5. The modular time division multiplexing expansion subsystem of claim 1 wherein said plurality of encoders add at least a first predetermined integer number of bits from the unique channel identification code after every second predetermined integer number of bits of said respective signal.

6. The modular time division multiplexing expansion subsystem of claim 5 wherein said first predetermined integer number is one and said second predetermined integer number is eight.

7. The modular time division multiplexing expansion subsystem of claim 1 wherein said data scrambler predetermined algorithm further comprises converting said respective signal by an Exclusive OR algorithm based upon predetermined binary number.

8. The modular time division multiplexing expansion subsystem of claim 7 wherein said predetermined binary number is at least seven bits in length.

9. The modular time division multiplexing expansion subsystem of claim 1 further comprising a first data buffer, a second data buffer and one or more subsequent data buffers, wherein if said multiplexing clock has not acquired data speed or lost data speed, said clock initially checks said first data buffer for data speed, and if no data speed is acquired, then checks said second data buffer, and if no data speed is acquired, in turn checks subsequent data buffers, repeating the pattern, until data speed is acquired.

10. The modular time division multiplexing expansion subsystem of claim 7 wherein said data scrambler further comprises a single chip with said Exclusive OR algorithm and said binary number contained therein.

11. The modular time division multiplexing expansion subsystem of claim 1 wherein said unique pseudo-random channel identification codes are stored in a shift registrar or in read-only memory.

12. The modular time division multiplexing expansion subsystem of claim 1 wherein said information-bearing signals received by said multiplexer module are at substantially the same data rate.

13. The modular time division multiplexing expansion subsystem of claim 1 further comprising one or more additional incoming information-bearing signals added to an input of said at least one multiplexer module after said multiplexer module is already in operation transmitting said plurality of incoming information-bearing signals, whereby incoming information bearing signals may be added or removed without disruption of service.

14. The modular time division multiplexing expansion subsystem of claim 1 wherein said at least one multiplexer module further comprises a plurality of multiplexer modules wherein the output of at least one of said plurality of multiplexer modules forms the input of another of said plurality of multiplexer modules, whereby said plurality of multiplexer modules can be arranged in cascade fashion to accommodate a greater number of incoming information-bearing signals than a single multiplexer module could accommodate.

15. The modular time division multiplexing expansion subsystem of claim 1 wherein said at least one demultiplexer module further comprises a plurality of demultiplexer modules wherein at least one of said demultiplexed signals, output from at least one of said plurality of demultiplexer modules, forms the input of another of said plurality of demultiplexer modules, whereby said plurality of demultiplexer modules can be arranged in cascade fashion to accommodate a greater number of incoming information-bearing signals than a single demultiplexer module could accommodate.

* * * * *